Figure 1:
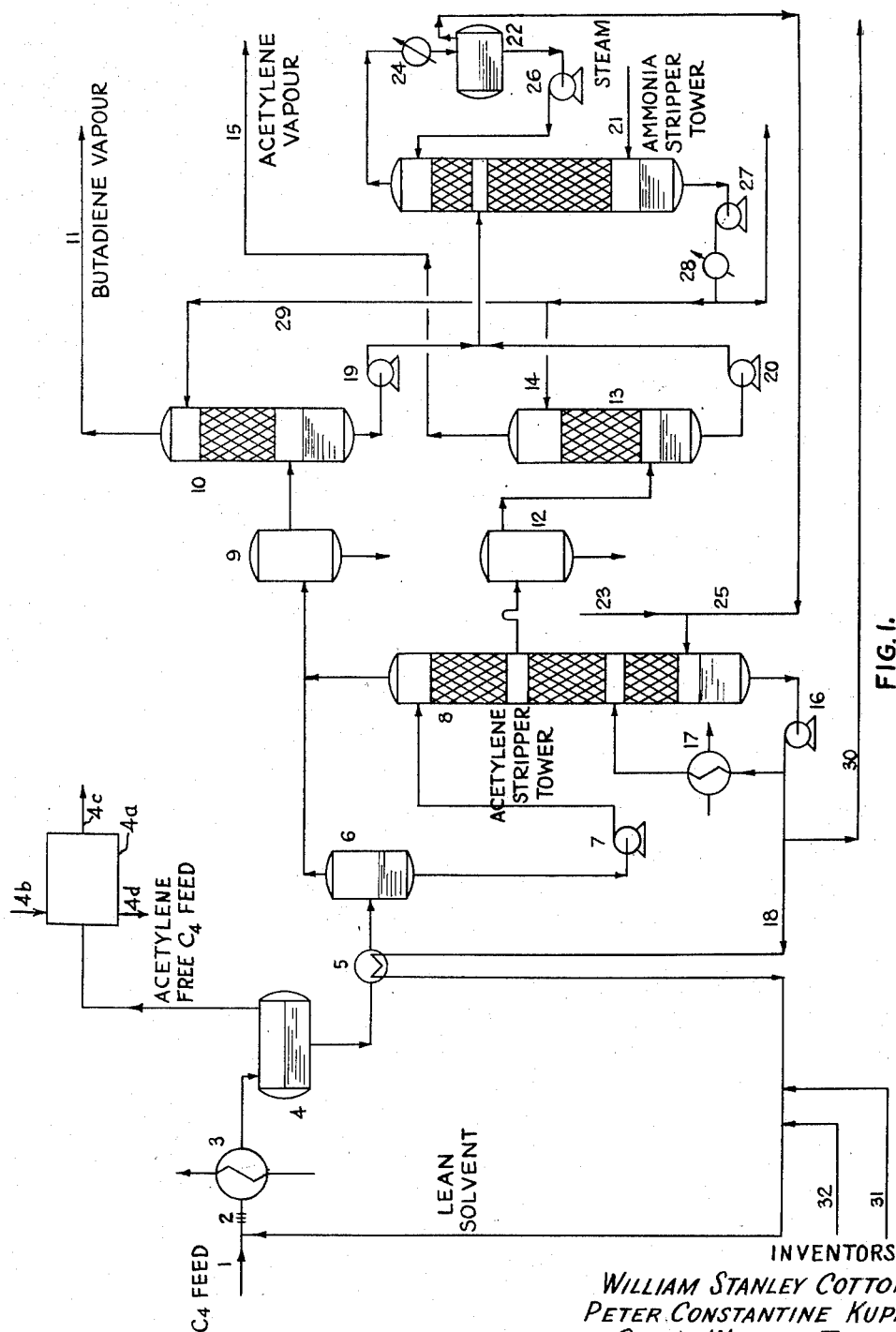
Figure 2:
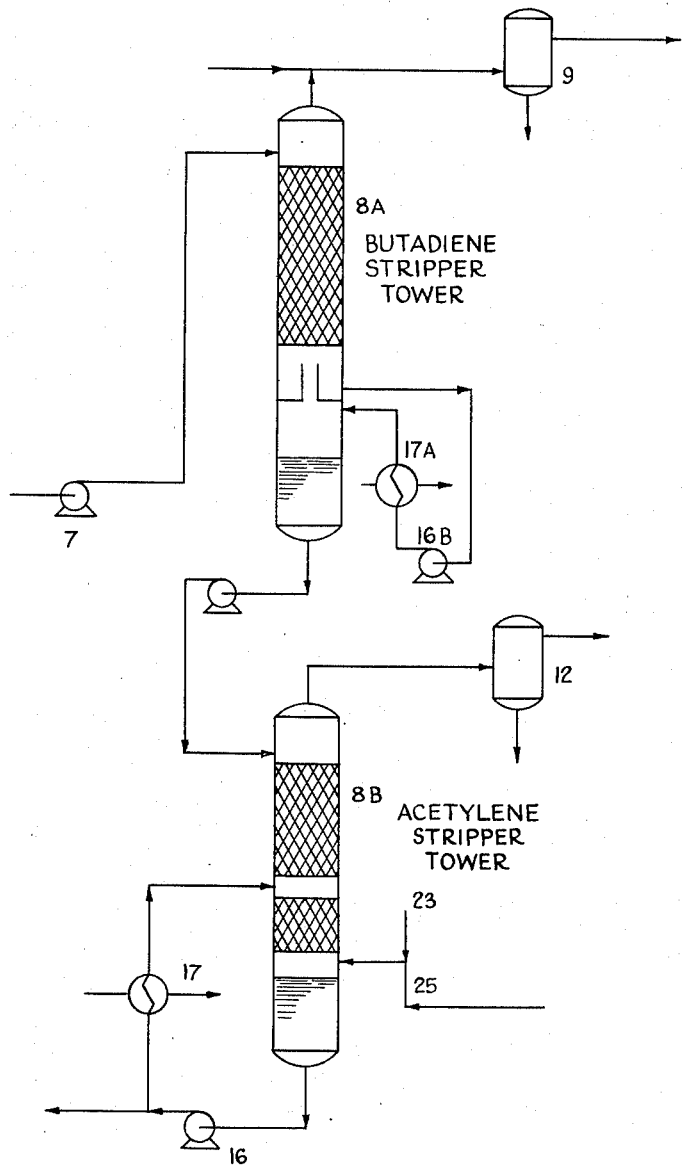
Figure 3:
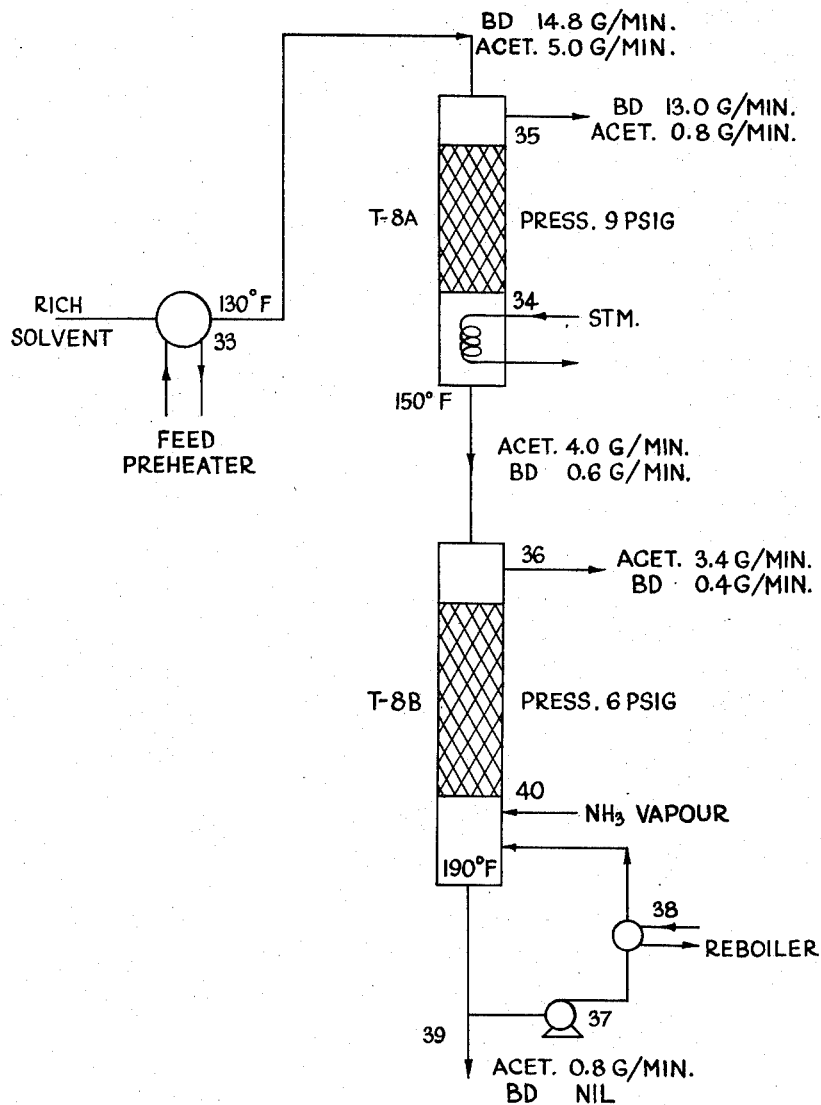

United States Patent Office 2,788,378
Patented Apr. 9, 1957

2,788,378

REMOVAL AND RECOVERY OF IMPURITIES FROM DIOLEFIN STREAMS

William Stanley Cotton, Dorval, Quebec, and Peter Constantine Kupa and Grant William Taylor, Sarnia, Ontario, Canada, assignors to Polymer Corporation, Limited, Sarnia, Ontario, Canada, a corporation of Canada Application May 2, 1952, Serial No. 285,832
Claims priority, application Canada December 10, 1951

9 Claims. (Cl. 260—681.5)

This invention is directed to the removal and recovery of certain undesirable impurities from diolefin streams. More particularly it is directed to a method of removing various acetylenes from dilute diolefin streams prior to the recovery of the desired diolefin from such hydrocarbon mixtures.

While the invention is is applicable to the purification of olefin and diolefin streams up to and including six carbon atoms, it is convenient to describe it with reference to $C_4$ hydrocarbons.

An important source of butadiene at present is the process of dehydrogenating butylenes. In the practice of that process a butylene rich stream is mixed with several volumes of superheated steam and at temperatures normally in the range of 1100° F. to 1200° F. is subjected to one of several commercially successful dehydrogenation catalysts. Depending on the type of catalyst, the temperature and the degree of steam dilution, the conversion of hydrocarbon may vary up to 50%. Of the hydrocarbon converted, 60 to 90% or even more may be converted to the desired butadiene. The non-butadiene components in the reactor effluent will comprise various hydrocarbons whose behaviour so closely resembles that of butadiene that their segregation presents major problems. Failure to segregate them has very undesirable results.

The reactor effluent or product is treated for the removal of $C_3$ hydrocarbons and lighter fractions. Propadiene, for example, has a higher boiling point than the other $C_3$ components and as a result is more difficult to separate from the product. Consequently, a large proportion of that component, if any is present, will continue to contaminate the $C_4$ stream. The recovery of high purity butadiene is then undertaken by one of several commercially acceptable processes. One preferred method involves the use of a selective solvent such as cuprous ammonium acetate. The relative solubilities of the various components which may be present in the dilute butadiene stream in cuprous ammonium acetate is indicated by the following table:

TABLE I

*Relative solubilities of hydrocarbons in CAA*

|  | (Approx.) |
|---|---|
| Normal and isobutanes | 0.01 |
| Trans butylene-2 | 0.05 |
| Isobutylene | 0.05 |
| Cis butylene-2 | 0.1 |
| Butylene-1 | 0.2 |
| Propylene | 0.7 |
| Butadiene 1:3 | 1.0 |
| Butadiene 1:2 | 2.0 |
| Propadiene | 5.0 |
| $C_4$ acetylenes | 40.0 |

It is evident that the components which are more soluble than butadiene in CAA are going to be removed from the hydrocarbon mixture and a portion will be recovered in the butadiene product. Their presence in the product is undesirable for any of the following reasons:

(1) Purity is reduced or more difficult to achieve without increasing butadiene losses.

(2) Acetylenes are less stable than butadiene and therefore increase hazards.

(3) Vinyl acetylenes are thought to promote undesirable crosslinking in emulsion polymerization reactions.

(4) Components which are inert in the polymerization reaction will recycle and accumulate, aggravating the problem of maintaining purity.

On the other hand alpha acetylenes are known to be very readily polymerizable, particularly at temperatures prevalent in the extraction process and in the presence of cuprous salts. (Canadian Patent 458,247 and United States Patents 2,566,135, 2,566,136 and 2,566,137.) The polymers formed, or their reaction products, have a strong emulsifying effect on the solvent and result in poor phase separation and considerable entrainment. It has been our experience that approximately 40% of the acetylenes will be recovered from the solvent as an impurity in the product. The remaining 60% will remain in the solvent, contaminating it and reducing the efficiency of the extraction process.

In the butylene dehydrogenation process, important among the commercially successful catalysts are the ferric oxide-chromium oxide type catalysts. A more recent development has been the calcium-nickel phosphate type catalyst. With the increased use of the latter type of catalyst, the problem of acetylene removal has been aggravated, for, as the following table indicates, an increase of acetylenes, especially vinyl acetylene, in the reactor product results. The increase experienced is indicated in Table II.

TABLE II

|  | Catalyst Type | |
|---|---|---|
|  | Fe-Cr Oxide, p. p. m. | Ca-Ni Phosphate p. p. m. |
| Total alpha acetylenes | 300 | 425 |
| $C_2H_2$ | 30 | 50 |
| Methyl acetylene | 50 | 90 |
| Ethyl acetylene | 95 | 185 |
| Vinyl acetylene | 25 | 100 |

At elevated temperatures, i. e. 180° F. and particularly in the presencve of cuprous salts and molar excesses of $NH_3$, the ethyl and vinyl acetylenes polymerize rapidly. Table III is indicative of the combined effect of disappearance and polymerization of the various acetylenes in the extraction process. It should be noted that the straight $C_2H_2$ was essentially removed by fractionation before the dilute butadiene stream was contacted with the solvent.

TABLE III

*Typical total alpha acetylene distribution in $C_4$ streams undergoing butadiene extraction by CAA solvent*

|  | Feed, Wt. Percent | Butadiene Product, Wt. Percent | Proportion of Acetylene Disappeared or Polymerized in the Unit, Percent |
|---|---|---|---|
| Methyl acetylene | 15.0 | 30.0 | 15 |
| Ethyl acetylene | 68.0 | 69.0 | 62 |
| Vinyl acetylene | 17.0 | 1.0 | 98 |

Various processes have been pursued commercially in an effort to eliminate acetylenes from the system but none have been completely satisfactory solutions to the twin problems of product purity and solvent contamination. These processes have been of two general types involving hydrogenation and polymerization. Other processes have been designed using aqueous acetone distillation processes and chemical removal methods.

Of the types involving hydrogenation as a solution to the problem the butylene dehydrogenation reactor product is exposed to a hydrogenation catalyst which converts a portion of the acetylenes to butadienes. A disadvantage is that it also converts a portion of the butadiene to butylenes.

Another method involves taking a side stream from the desorber tower in the extraction unit and hydrogenating the acetylenes to butadiene. A disadvantage of this method and its variations is that it permits contamination of the solvent by acetylenes before they are removed.

United States Patents 2,566,135, 2,566,136 and 2,566,137 describe a process whereby a large portion of the butadienes are stripped, and then polymerization of the acetylenes is promoted. The acetylene polymers are then recovered by a suitable solvent to restore the efficiency of the CAA solution.

It is the object of this invention to remove and recover virtually all of the acetylenes from the dilute butadiene stream before such stream comes in contact with the main body of solvent in the extraction process and thus prevent contamination of both the solvent and the product.

It is also the object of this invention to remove propadiene from the hydrocarbon stream and prevent it from appearing as an impurity in the butadiene rich product.

It is a further object of this invention to remove all hydrocarbon impurities from the diolefin stream being purified that show a higher solubility, than butadiene 1,3 in CAA.

In the drawings which illustrate the practice of the invention:

Figure I is a general flow plan.

Figure II illustrates a preferred embodiment of the stripping procedure which affords greater control of temperature and pressures.

Figure III illustrates a simplified version of Figure II.

*Typical analysis of the feed stock to the butadiene extraction unit*

| Component: | Mol Percent |
|---|---|
| Total $C_3$ | 0.3 |
| Isobutylene | 9.0 |
| N-butylene | 46.5 |
| 1:3 butadiene | 25.0 |
| 1:2 butadiene | 0.1 |
| Butane | 19.0 |
| Total $C_5$ | 0.1 |
|  | 100.0 |

This feed stock is introduced to the system via 1, and to it is added cuprous ammonium acetate through a mixing device 2. The ratio of $C_4$ feed to solvent can be varied from 1:1 to 10:1, by weight, however a ratio of 5:1 by weight has been found adequate to remove a major portion of the acetylenes. It is desirable to introduce a minimum amount of solvent with the feed, consistent with optimum acetylene removal, in order to reduce to a minimum the amount of butadiene extracted from the feed at this point.

The relatively small amount of solvent used for acetylene removal can be illustrated by comparison with the main butadiene extraction process, where the ratio of $C_4$ feed to solvent necessary for good butadiene recovery is approximately 1:10 by weight.

The $C_4$ solvent mixture from mixing device 2 is transferred to the butadiene extraction unit feed pre-cooler 3. (The solvent absorbs any water from the hydrocarbon feed and prevents plugging of equipment due to icing.) The chilled feed and solvent, in which is dissolved virtually all of the acetylene, propadiene, some butadiene and even some butylenes, is sent to the separator drum 4. The acetylene free hydrocarbon feed is then drawn off the top of 4 and sent to the extraction unit 4a for extraction of the butadiene content. In the extraction unit 4a, the main body of solvent is applied as at 4b in the ratio of approximately 1:10 by weight of $C_4$ feed to solvent as indicated above. The butadiene containing solvent obtained from extraction unit 4a is indicated at 4c while the residue of the $C_4$ feed is indicated at 4d. The rich solvent is drawn off the bottom of drum 4 and is heated by exchange with lean solvent in heat exchanger 5. The heated rich solvent is then pressured to a pre-flash drum 6 where the butylenes and most of the butadiene are vapourized. The major portion of components more soluble than butadiene remain in the solvent. The solvent is then transferred by pump 7 to the stripper tower 8 where the remainder of the butadiene and the other hydrocarbons present are removed from the solvent. The overhead vapour from tower 8, consisting mainly of butadiene, is transferred, along with the butadiene vapour from pre-flash drum 6 to a knockout drum 9 where any entrained solvent can be caught. This entrained solvent is drained to the unit solvent drip accumulator drum (not shown) for return to the main solvent system. The hydrocarbon gases are water washed in an absorber tower 10 for recovery of the ammonia flashed from the solvent. The ammonia free $C_4$ stream is then returned to the dehydrogenation unit where it is subjected to fractionation for removal of impurities before eventually returning to the butadiene extraction unit in the feed through line 1.

A vapour rich in acetylene is withdrawn as a side stream from tower 8 and, after passing through knockout drum 12 for removal of any entrained solvent, is introduced to water wash tower 13 for the removal of the ammonia present in the vapour. The ammonia-free acetylene product is recovered via line 15. This stream will also contain propadiene, 1:2 butadiene and any other diolefin more soluble in solvent than 1:3 butadiene.

The solvent leaving stripper 8 is recirculated through a steam heated reboiler 17 at a high rate by pump 16 in order to maintain a low temperature difference between the solvent entering and leaving the reboiler. A portion of this solvent stream, approximately equal to the solvent feed to tower 8 is drawn off through line 18 to maintain a constant level in the bottom of the tower. The lean solvent leaving in line 18 is cooled in exchanger 5 by heat exchange with cold solvent from drum 4 and returned to mixer 2.

The water streams containing ammonia, from the bottom of wash towers 10 and 13, are pumped by pumps 19 and 20 respectively to an ammonia stripper tower 21 in the butadiene extraction unit. By means of steam charged to the tower 21, ammonia is flashed from the water and partially condensed in exchanger 24. The condensed portion is returned as reflux from reflux drum 22 to tower 21 by means of pump 26. The uncondensed ammonia vapour from drum 22 is returned to the solvent via line 25, and any losses are made up by charging ammonia from storage through line 23.

The hot water from the bottom of stripper tower 21 is picked up by pump 27 and cooled in exchanger 28. A portion of this water is returned to wash towers 10 and 13 via lines 14 and 29 for the removal of ammonia from the hydrocarbon streams. The remainder of this water is used in the butadiene extraction unit for the recovery of ammonia from butadiene.

As the solvent in this system becomes difficult to handle and foaming is encountered due to the emulsifiers formed by reaction products of acetylene polymers, it may be removed from the system for treatment in an activated charcoal system. This may be done through line 30, while fresh solvent may be added through line 32 to maintain the proper level in the system. Water vapour losses in tower 8 may be compensated for by the continuous addition of water through line 31.

Figure II illustrates a preferred embodiment of this invention in that it demonstrates the stripper tower 8 in Figure I as divided into two sections, 8A and 8B permitting better temperature and pressure control for the selective stripping of butadiene and acetylene. The hydrocarbon rich solvent is fed to the top of tower 8A and, with the bottom of the tower maintained at 150° F. and the pressure at 9 p. s. i. g., good butadiene recovery overhead is realized without excessive stripping of acetylene. This overhead stream is taken with the overhead vapour from the flash drum 6 to a knockout drum 9. The bottom solvent stream from tower 8A is circulated through reboiler 17A by pump 16B and is transferred to the top of tower 8B. The overhead from tower 8B, rich in acetylenes, is transferred to knockout drum 12 to trap any entrained solvent. The vapour from drum 12 is then fed to the acetylene wash tower 13 as before. Ammonia is continuously added to tower 8B to make up ammonia losses from the solvent which occur when large proportions of hydrocarbon are mixed with small proportions of solvent. The bottom of tower 8B is maintained at a temperature of 185°–190° F. at a pressure of 6 p. s. i. g.

Figure III illustrates a simplified version of Figure II in which operations resulted in the data set out in Examples I and II.

In Figure III the rich solvent passes through preheater 33, which raises the temperature to 130° F. to stripper tower T–8A which has a pressure of 9 p. s. i. g. and the bottom of which is maintained at 150° F. by steam coil 34. The overhead stream passes along line 35 to a flash drum (not shown). The bottom solvent stream is transferred to stripper tower T–8B the bottom of which is maintained at a temperature of 190° F. and which has a pressure of 6 p. s. i. g. The overhead stream from tower T–8B passes along line 36 to a flash drum (not shown). Part of the bottom solvent stream is recirculated by pump 37 through reboiler 38 and part is drawn off along line 39 for return to the mixer (not shown). Ammonium vapour is added through line 40 to tower T–8B to make up losses.

The following examples illustrate the practice of the invention employing stripping towers as illustrated in Figure III.

EXAMPLE I

A butadiene rich stream comprising 4–5000 p. p. m. acetylenes was contacted and intimately mixed with lean cuprous ammonium acetate solvent. The CAA was then drawn off the bottom, heated, and sent to the top of tower T–8A at the rate of 600 grams per minute containing 14.8 grams butadiene and 5.0 grams of acetylenes. Towers T–8A and T–8B were maintained at 9 p. s. i. g. and 6 p. s. i. g. respectively and the bottoms temperatures at 150° F. and 190° F. respectively. The feed to tower T–8B was regulated by a liquid level controller. NH₃ was added to tower T–8B to make up losses.

The recovery was as follows:

|  | Butadiene, Grams/min. | Acetylenes, Grams/min. |
|---|---|---|
| T–8A Overhead | 13.0 | 0.8 |
| T–8B Overhead | 0.4 | 3.4 |
| T–8B Bottoms | Nil | 0.8 |

EXAMPLE II

In the same equipment operated at the same temperatures and pressures, 600 grams of solvent containing 10.3 grams butadiene and 5.4 grams acetylene, the yields were as follows:

|  | Butadiene, Grams/min. | Acetylenes, Grams/min. |
|---|---|---|
| T–8A Overhead | 10.9 | 0.3 |
| T–8B Overhead | 0.36 | 2.9 |
| T–8B Bottoms | Nil | 0.5 |

While the above examples illustrate the practice of the invention with relationship to the removal of acetylenes only, it may be practised with corresponding success to remove propadiene. Where propadiene is present it may be removed to a very satisfactory degree with acetylenes, as its vapour pressure with relationship to CAA solution is substantially higher than acetylenes and substantially lower than butadiene.

Where the butadiene recovery is directed exclusively to the recovery of butadiene 1:3, the practice of this invention will serve to reduce the quantities of butadiene 1:2 which normally contaminate the product. The butadiene 1:2 can be further reduced in the rerun tower by fractionation. Propadiene, on the other hand, is lighter than 1:3 butadiene and is not removed in the rerun tower.

We claim:

1. In the process of diolefin extraction by means of a cuprous ammonium acetate solvent, the steps of intimately contacting a dilute diolefin stream with a stream of solvent in a ratio of between about 5:1 to 10:1 by weight of hydrocarbon stream to solvent before the dilute diolefin stream comes in contact with the main body of the solvent in an extraction unit, thereby dissolving a relatively small portion of the said diolefin present in such dilute stream, and virtually all of the components of the said dilute stream which are more soluble in the solvent than is the said diolefin, separating a hydrocarbon stream from the rich solvent, thence recovering the dissolved diolefin and other components from the solvent in separate relatively pure streams in a series of stripping steps, and recycling the lean solvent back to the dilute stream.

2. In a process of diolefin extraction by means of a cuprous ammonium acetate solvent from a predominantly C₄ hydrocarbon stream produced by dehydrogenating butylenes and removing most of the C₃ hydrocarbons and lighter fractions the step of selectively removing the hydrocarbons which are more soluble in said solvent than said diolefin by dissolving said more soluble hydrocarbons in said solvent in a ratio of between about 5:1 to 10:1 by weight of hydrocarbon stream to solvent prior to extraction of said diolefin with a larger amount of said solvent.

3. In a process of diolefin extraction by means of a cuprous ammonium acetate solvent from a predominantly C₄ hydrocarbon stream produced by dehydrogenating butylenes and removing most of the C₃ hydrocarbons and lighter fractions the step of selectively removing acetylenes by dissolving said acetylenes in said solvent in a ratio of between about 5:1 to 10:1 by weight of hydrocarbon stream to solvent prior to extraction of said diolefin with a larger amount of said solvent.

4. In a process of diolefin extraction by means of a cuprous ammonium acetate solvent from a predominantly C₄ hydrocarbon stream produced by dehydrogenating butylenes and removing most of the C₃ hydrocarbons and lighter fractions the step of selectively removing the hydrocarbons which are more soluble in said solvent than said diolefin by dissolving said more soluble hydrocarbons in said solvent in the ratio of approximately 5:1 by weight of hydrocarbon stream to solvent prior to extraction of said diolefin with said solvent in the ratio of approximately 1:10 by weight of hydrocarbon stream to solvent.

5. In a process of diolefin extraction by means of a cuprous ammonium acetate solvent from a predominantly C₄ hydrocarbon stream produced by dehydrogenating butylenes and removing most of the C₃ hydrocarbons and lighter fractions the step of selectively removing the hydrocarbons which are more soluble in said solvent than said diolefin by dissolving said more soluble hydrocarbons in said solvent in the ratio of between 5:1 and 10:1 by weight of hydrocarbon stream to solvent prior to extraction of said diolefin with said solvent in the ratio of approximately 1:10 by weight of hydrocarbon stream to solvent.

6. A process as in claim 1, in which the diolefin is butadiene 1,3.

7. A process as in claim 4 in which the diolefin is butadiene 1,3.

8. In a process of 1,3 butadiene extraction by means of a cuprous ammonium acetate solvent from a predominantly $C_4$ hydrocarbon stream produced by dehydrogenating butylenes and removing most of the $C_3$ hydrocarbons and lighter fractions, the steps of treating said hydrocarbon stream with said solvent in the ratio of approximately 5:1 by weight of hydrocarbon stream to solvent and separating said solvent to provide a solvent stream rich in hydrocarbons more soluble in said solvent than said 1,3 butadiene prior to extraction of said diolefin with further quantities of said solvent in the ratio of approximately 1:10 by weight of hydrocarbon stream to solvent, treating said rich solvent stream to vaporize its content of butylenes and part of its 1,3 butadiene content, then stripping the remainder of the 1,3 butadiene from said solvent and at the same time separately removing a vapour rich in acetylene and diolefins more soluble in said solvent than 1:3 butadiene.

9. In a process of diolefin extraction by means of a cuprous ammonium acetate solvent, the steps of intimately contacting a diolefin-containing stream with a stream of solvent in the ratio of about 3:1 to 8:1 by weight of hydrocarbon stream to solvent before the diolefin-containing stream is passed to a diolefin extraction unit, thereby dissolving a relatively small portion of the said diolefin present in said diolefin-containing stream, and virtually all of the components of said diolefin-containing stream which are more soluble in the solvent than is said diolefin, separating a hydrocarbon stream from the solvent containing dissolved diolefin and other components, thence recovering the dissolved diolefin and other components in separate relatively pure streams in a series of stripping steps, and recycling the lean solvent back to the diolefin-containing stream.

References Cited in the file of this patent
UNITED STATES PATENTS

| | | |
|---|---|---|
| 2,370,809 | Morrell et al. | Mar. 6, 1945 |
| 2,389,647 | Soday | Nov. 27, 1945 |
| 2,401,896 | Asbury et al. | June 11, 1946 |
| 2,440,493 | Shipley | Apr. 27, 1948 |
| 2,451,327 | Fasce et al. | Oct. 12, 1948 |